F. THOMAS.
MANIFOLDING SALES CHECK.
APPLICATION FILED FEB. 1, 1907.
905,606.
Patented Dec. 1, 1908.
2 SHEETS—SHEET 2.
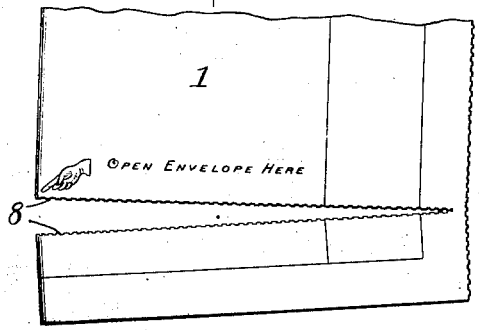
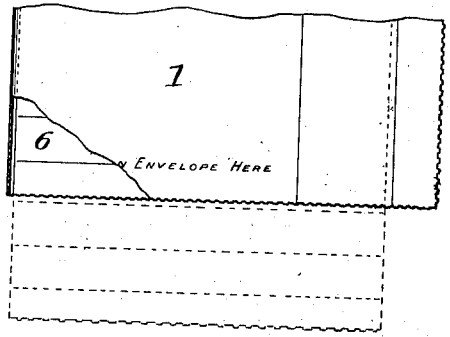
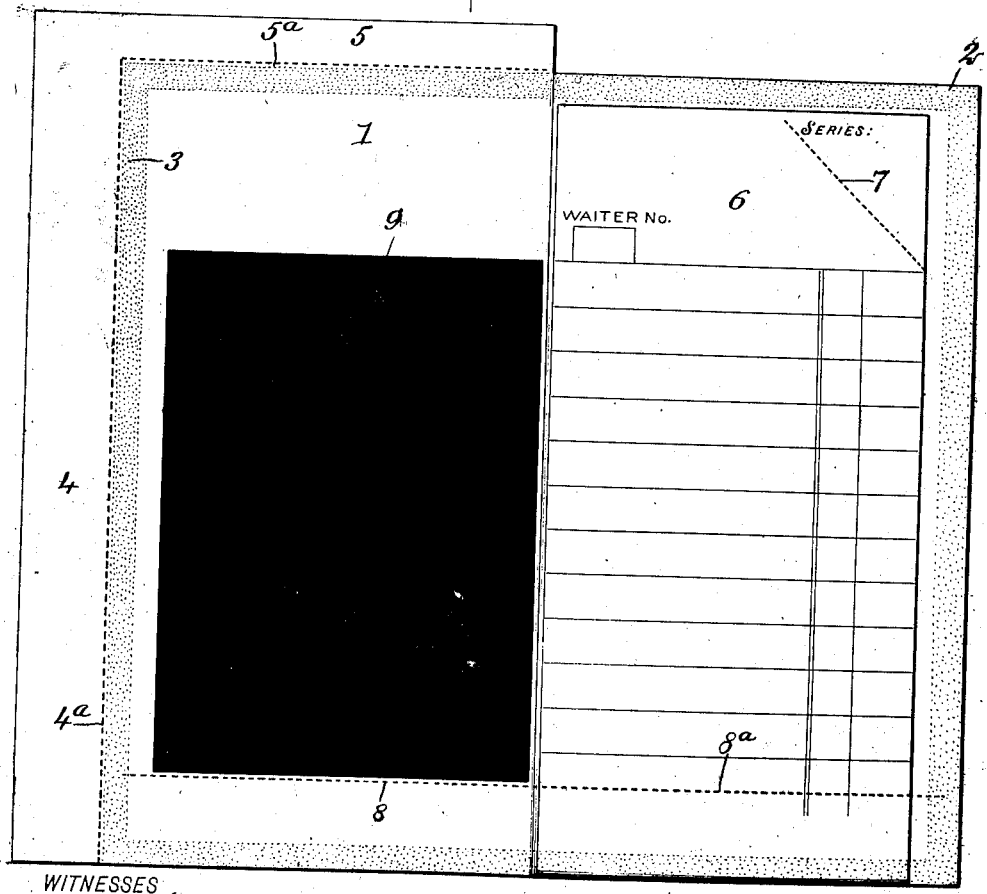
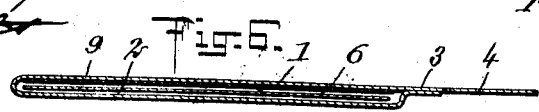
INVENTOR
Frank Thomas
BY
ATTORNEYS
WITNESSES

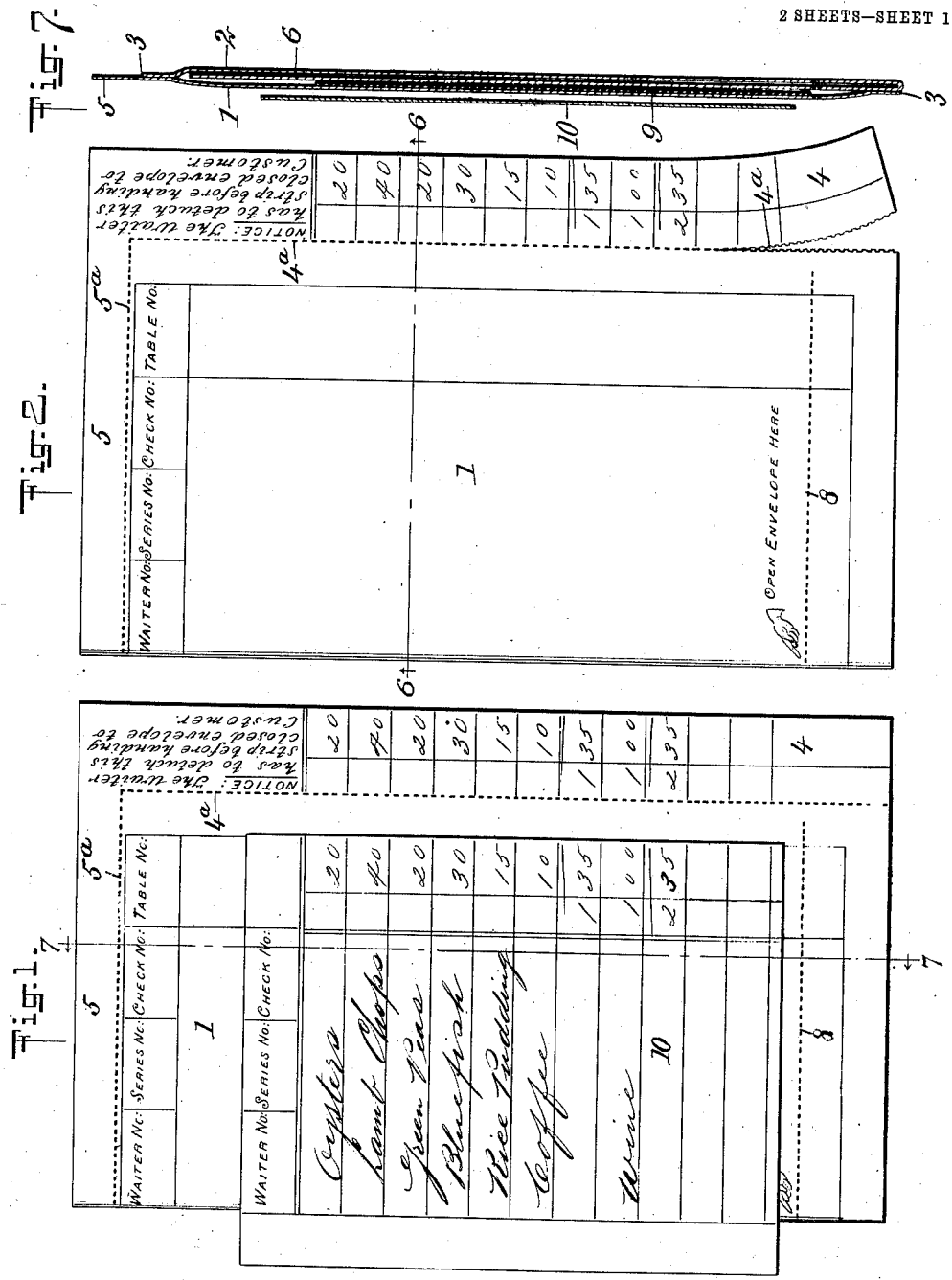

UNITED STATES PATENT OFFICE.

FRANK THOMAS, OF NEW YORK, N. Y.

MANIFOLDING SALES-CHECK.

No. 905,606.　　　Specification of Letters Patent.　　　Patented Dec. 1, 1908.

Application filed February 1, 1907. Serial No. 355,314.

*To all whom it may concern:*

Be it known that I, FRANK THOMAS, a citizen of the United States, and a resident of the city of New York, borough of Manhattan, county and State of New York, have invented a new and Improved Manifolding Sales-Check, of which the following is a full, clear, and exact description.

The invention has in view the provision of a sales check for hotel and restaurant use by which it will be impossible, without the same being detected, for the waiter to render the patron a bill for any other amount than that specified by the order slip or slips turned in to the checker or cashier, also to keep the check in a clean and sanitary condition.

With the present checking system as used in large hotels and restaurants, it has been found impractical to protect both the management and the patron against the rendering of false checks by those intrusted with this duty, as ample opportunity is often found and taken advantage of to manipulate the check whereby the patron is overcharged or the proprietor receives payment for less than the actual goods delivered.

I have conceived a system and a novel form of check by which these disadvantages are overcome, necessitating exposure in any case where the same account is not rendered to the proprietor as rendered to the patron. I accomplish this by inclosing a blank slip or other surface on which the check for the guest or patron is made out, in an envelop or other receptacle, the articles purchased being duplicated thereon by carbon paper or other suitable reproducing material as the articles are written out on the order slips.

Reference is to be had to the accompanying drawings forming a part of this specification, in which similar characters of reference indicate corresponding parts in all the figures.

Figure 1 is a face view of one embodiment of my invention showing an order slip in place as when writing thereon the different articles ordered; Fig. 2 is a like view with the order slip removed and showing the extended portion at one side of the receptacle or envelop in the act of being torn off; Fig. 3 is a face view of the lower portion of the envelop showing the manner in which it is preferably opened; Fig. 4 is a view corresponding to Fig. 3, partly in section and after the envelop is opened, the check being shown partially withdrawn therefrom in dotted outline; Fig. 5 is an inside view of the envelop or receptacle before the same is sealed; Fig. 6 is a cross section on the line 6—6 of Fig. 2, and Fig. 7 is a longitudinal section on the line 7—7 of Fig. 1.

The invention as preferably constructed, comprises an envelop or receptacle composed of two leaves of paper or other material 1 and 2, which are folded upon each other and gummed at the meeting edges, as indicated at 3, forming a sealed inclosure. As best shown in Fig. 5, the leaf 1 is of slightly greater length and width, providing an extended portion 4 at one side, and an extended portion 5 at the top, which are separated from the leaf 1 and the receptacle of which said leaf is a part, by lines of perforations 4ª and 5ª, respectively. Formed as an integral part and attached to the bottom of either of the leaves 1 or 2, as, for example, as shown in Fig. 5, is a sales check blank 6, which is provided with suitable ruling on its face for receiving the duplicate of the orders recorded on the order slips. At one corner of the check, a diagonal line of perforations 7 is formed, and near the bottom thereof a cross line of perforations 8ª coincident with a line of perforations 8 formed in the leaves of the envelop, is provided. In some cases it may be found expedient to dispense with the check 6 in the form of an independent slip, and produce said check directly on the inner face of the leaf 2 of the receptacle.

On the leaf 1 of the envelop is a reproducing material 9, which is so positioned as to be adjacent to the ruled portion of the check 6 when the envelop is sealed. This material 9 may be in the form of an independent leaf of carbon paper, or may be in the nature of a coating directly applied to the inner face of the leaf 1.

As shown in Figs. 1 and 2, the top face of the envelop is provided with suitable ruling and printed matter as also the extended portion 4, the ruling on the latter being such as to receive the price mark of the articles ordered and the total amount of the same.

Disposed over the top face of the envelop when in use, is an order slip 10, which is also preferably ruled and positioned to bring the lines thereof in alinement with those on the portion 4. With the order slip in this position the articles as ordered, are written thereon, together with the price, which is, by reason of the impression of the pencil, reproduced on the inclosed check 6, the price of the articles being also placed on the extended portion 4. As shown in Fig. 1, the entire order is written on a single order-slip. This will, however, be seldom if ever, so in practice, as several order slips will ordinarily be used with the order of each customer, each order as it is given in, being written on the slip together with the price, as is also the latter on the extended portion 4. The slip is then turned in at the kitchen to the checker or to the cashier before the article named thereon is obtained. It is thus seen that unless some account is kept by the waiter independent of the order slips, of the articles served, it would be impossible to know the total cost of the order until the envelop was opened. This function is performed by the memoranda on the extended portion 4, said memoranda also indicating the last line of the check on which an order was reproduced, thus avoiding the likelihood of producing two orders on the same line of the check.

When the patron is in readiness for his bill, the waiter detaches the extended portions 4 and 5 on the perforated lines 4ª and 5ª, respectively, and submits the check in a sealed envelop. The patron thereupon tears the same open on the line 8, which also acts to detach the check from the sheet 2 on the perforated line 8ª. The check can then be readily withdrawn from the envelop and observed. As shown, the perforated line 8 at the bottom of the envelop is not extended the entire width of the same; otherwise the envelop might accidentally be opened in detaching the portion 4 on the perforated line 4ª.

When the check 6 is turned in to the cashier, it is stamped at the top over the perforated line 7, the corner of the check being torn off on this line and returned to the waiter as a receipt for the money received.

I am aware that prior to my invention matter has been reproduced in an inclosed receptacle by the aid of carbon paper placed therein. I, however, believe that it is broadly new to produce a restaurant or hotel sales check within a sealed receptacle and present the same to the patron or guest while still sealed.

Having thus described my invention I claim as new and desire to secure by Letters Patent:

1. In a manifolding sales check for hotels and restaurants, a sealed receptacle having an extended portion at one side thereof separated from the receptacle by a line of perforations, a reproducing material within the receptacle, and a sales check blank within the receptacle formed as a part thereof adjacent to said reproducing material, said blank having a perforated corner and a perforated lower end coincident with a line of perforations formed in the lower end of the receptacle, whereby as the receptacle is opened thereon, the blank will be detached therefrom and an order-slip superposed on said receptacle.

2. In a manifolding device, the combination of an envelop sealed at opposite sides and having a sales check therein, and a reproducing material within the envelop in copying relation to the sales check, whereby when the articles purchased and purchase price are recorded at the outside of the envelop contiguous thereto, a copy is made on the sales check, said envelop having an extended portion at one side thereof separated from the body of the envelop by an indicated line on which it is adapted to be detached, for receiving said purchase price.

In testimony whereof I have signed my name to this specification in the presence of two subscribing witnesses.

FRANK THOMAS.

Witnesses:
W. W. HOLT,
JNO. M. RITTER.